March 27, 1956    S. A. SCHERBATSKOY    2,740,051
RADIOACTIVITY WELL LOGGING APPARATUS
Filed Oct. 21, 1950    5 Sheets-Sheet 1

Fig. 1

INVENTOR.
Serge A. Scherbatskoy
BY
Mason, Kolehmainen, Rathburn & Wyss
Attys

March 27, 1956 S. A. SCHERBATSKOY 2,740,051
RADIOACTIVITY WELL LOGGING APPARATUS
Filed Oct. 21, 1950 5 Sheets-Sheet 2

Fig. 2

INVENTOR.
Serge A. Scherbatskoy
BY
Mason, Kolehmainen,
Rathburn & Wyss
Attys

March 27, 1956  S. A. SCHERBATSKOY  2,740,051
RADIOACTIVITY WELL LOGGING APPARATUS
Filed Oct. 21, 1950  5 Sheets-Sheet 4

Fig. 4

INVENTOR.
Serge A. Scherbatskoy
BY Mason, Kolehmainen,
Rathburn & Wyss
Attys

March 27, 1956  S. A. SCHERBATSKOY  2,740,051
RADIOACTIVITY WELL LOGGING APPARATUS
Filed Oct. 21, 1950  5 Sheets-Sheet 5

Fig. 5

INVENTOR.
Serge A. Scherbatskoy
BY
Mason, Kolehmainen, Rathburn & Wyss
att'ys

United States Patent Office 2,740,051
Patented Mar. 27, 1956

2,740,051

RADIOACTIVITY WELL LOGGING APPARATUS

Serge A. Scherbatskoy, Tulsa, Okla., assignor to Perforating Guns Atlas Corporation, Houston, Tex., a corporation of Delaware Application October 21, 1950, Serial No. 191,475

8 Claims. (Cl. 250—83.6)

This invention relates to borehole logging apparatus and more particularly to combined radioactivity and collar logging apparatus for cased boreholes; and the invention has for an object the provision of novel and reliable apparatus of this character. This application relates in part to certain features of novelty in the system disclosed in copending application Serial No. 191,476, Jacques H. Castel and Serge A. Scherbatskoy, filed October 21, 1950.

Within recent years, radioactivity logging in oil well drilling has come into widespread use. For example, such logs have been used in new wells when drill pipe and electrical logs are in considerable disagreement, and also to correlate the location of competent subsurface markers in sections not indicated by an electrical log. Additionally, radioactivity logs have been used to obtain data indicative of formation porosity and density and to clarify or confirm uncertain anomalies indicated on electrical logs. Also, radioactivity logs have been used to obtain an accurate log of cased-off formations in old wells and to obtain a continuous log in deep end wells for correlation with other deep wells in the area for structural analysis. In all these radioactivity well logging applications it is necessary to obtain accurate depth measurements both for the purpose of correlating the radioactivity log and the purpose of checking previous depth measurements. Of the conventional depth measuring methods, the collar logging method is by far the most accurate; such devices as the depth measuring sheave, etc., being inaccurate due to stretching of the supporting cable as the apparatus is lowered into the well. It would be desirable, moreover, to provide facilities for obtaining a combined radioactivity and collar position log and to employ only a single conductor armored cable to raise and lower the apparatus, to supply power to the subsurface equipment and to transmit all of the logging information from the subsurface equipment to the surface equipment. Such a cable is easy to handle, is inexpensive and may be constructed to withstand the weight of many thousands of feet of its own length.

Accordingly, it is a further object of the present invention to provide a new and improved apparatus for obtaining a combined radioactivity and collar position log.

It is still another object of the present invention to provide new and improved apparatus for obtaining a combined radioactivity and collar position log in which a single cable, which is used to lower the apparatus into the borehole, is employed to convey all of the logging information to the surface equipment, and is also used to supply electrical power to the subsurface apparatus.

It is another object of the present invention to provide new and improved radioactivity well logging apparatus which is substantially insensitive to amplitude changes in the pulses produced by the radiation detector of the subsurface equipment.

It is a further object of the present invention to provide new and improved radioactivity well logging apparatus which is responsive only to the rate of occurrence of pulses produced by the radiation detector embodied in the subsurface equipment.

It is still another object of the invention to provide a new and improved subsurface unit adapted for use in a combined radioactivity and collar position logging system.

The invention, both as to its organization and method of operation, together with further objects and advantages thereof, will best be understood by reference to the following specification taken in connection with the accompanying drawings in which.

Figure 1:
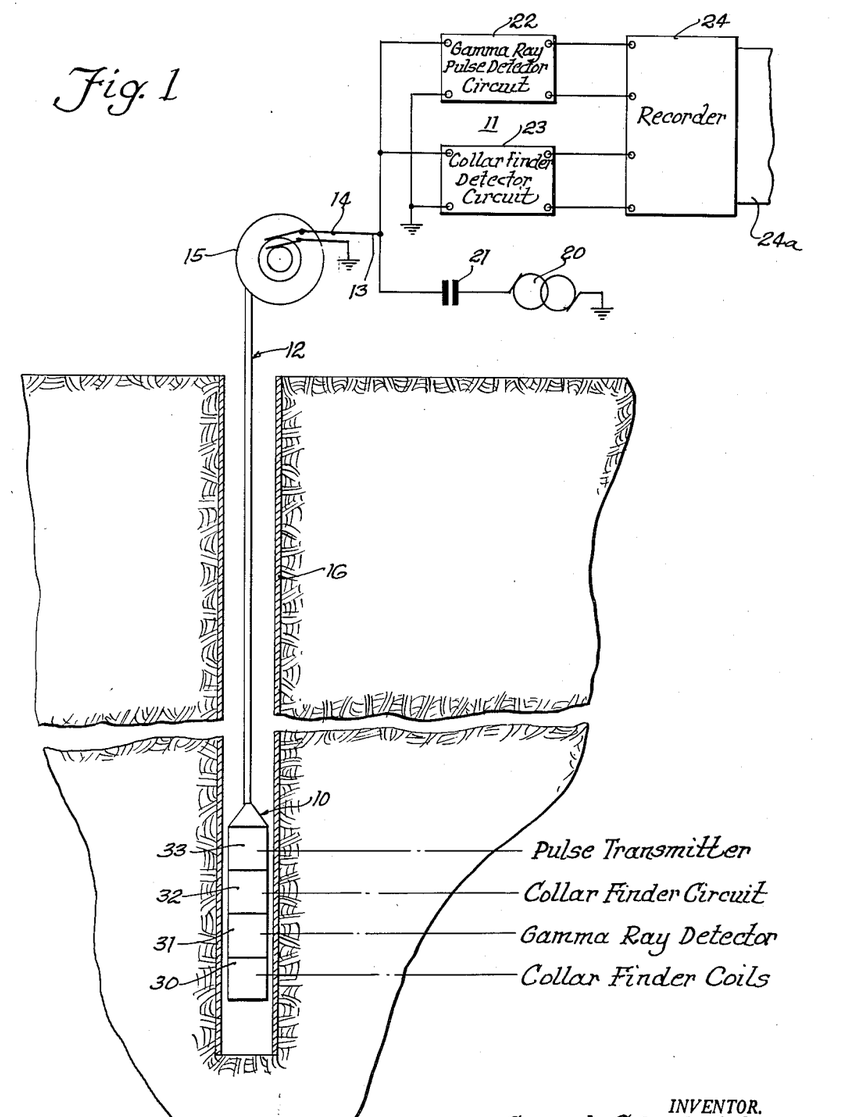
Fig. 1 diagrammatically illustrates combined radioactivity and collar position logging apparatus characterized by the features of the present invention.

Referring now to the drawings and more particularly to Fig. 1 thereof, the combined radioactivity and collar position logging apparatus there illustrated generally comprises a subsurface unit 10 and a surface unit 11 interconnected by means of a single conductor coaxial cable 12. The arrangement illustrated is particularly adapted for the production of gamma ray logs of boreholes traversed by the subsurface unit 10.

In general, the subsurface equipment 10 comprises a pulse transmitter 33 for transmitting signal modulated pulses over the cable 12 to the surface equipment 11, a collar finder circuit 32, a gamma ray detector circuit 31 and collar finder coils 30. These components are all housed within a sealed housing having the requisite physical strength to withstand the fluid pressures encountered and are preferably located in the housing in the particular order illustrated. The unit 10 is arranged to be lowered into the borehole by means of the cable 12 which preferably is of the coaxial type and comprises a center conductor 13 surrounded by and insulated from an armored sheath 14. This sheath is appropriately grounded at the earth's surface and an alternating current generator 15, forming a part of the surface equipment 11 and coupled to the cable conductor 13 through a blocking condenser 21, is utilized to supply power over the cable 12 to the subsurface unit 10. As will be understood by those skilled in the art, the cable 12 extends into the borehole and is carried on a suitable power operated drum 15 located at the earth's surface. Conventional drive facilities may be provided for rotating the drum 15 in either direction, whereby the cable 12 may be fed into or reeled out of the borehole so as to move the subsurface unit 10 longitudinally of the borehole. In the particular arrangement illustrated in Fig. 1, the borehole is lined with the usual ferrous metal casing 16 which is provided with collar coupling elements, not shown, along the length thereof. These elements have the effect of increasing the wall thickness of the casing at evenly spaced points along the length of the casing and hence serve as casing section markers.

Generally considered, the surface equipment 11 comprises a gamma ray pulse detector circuit 22, a collar finder detector circuit 23 and a recorder 24 which preferably is of the commercial type known as the Speed-O-Max, manufactured and sold by the Leeds and Northrup Company of Philadelphia, Pa. Specifically, the output circuits of the units 22 and 23 are connected to the recording instrument 24, which operates to produce on the record strip 24a a continuous graph of the gamma ray signals transmitted to the equipment 11 from the subsurface equipment 10. The recorder 24 also responds to the signals supplied by the detector circuit 23 to produce record indications on the strip 24a of the positions of the casing collars, so that a correlated gamma ray intensity and depth measurement log is obtained.

Figure 2:
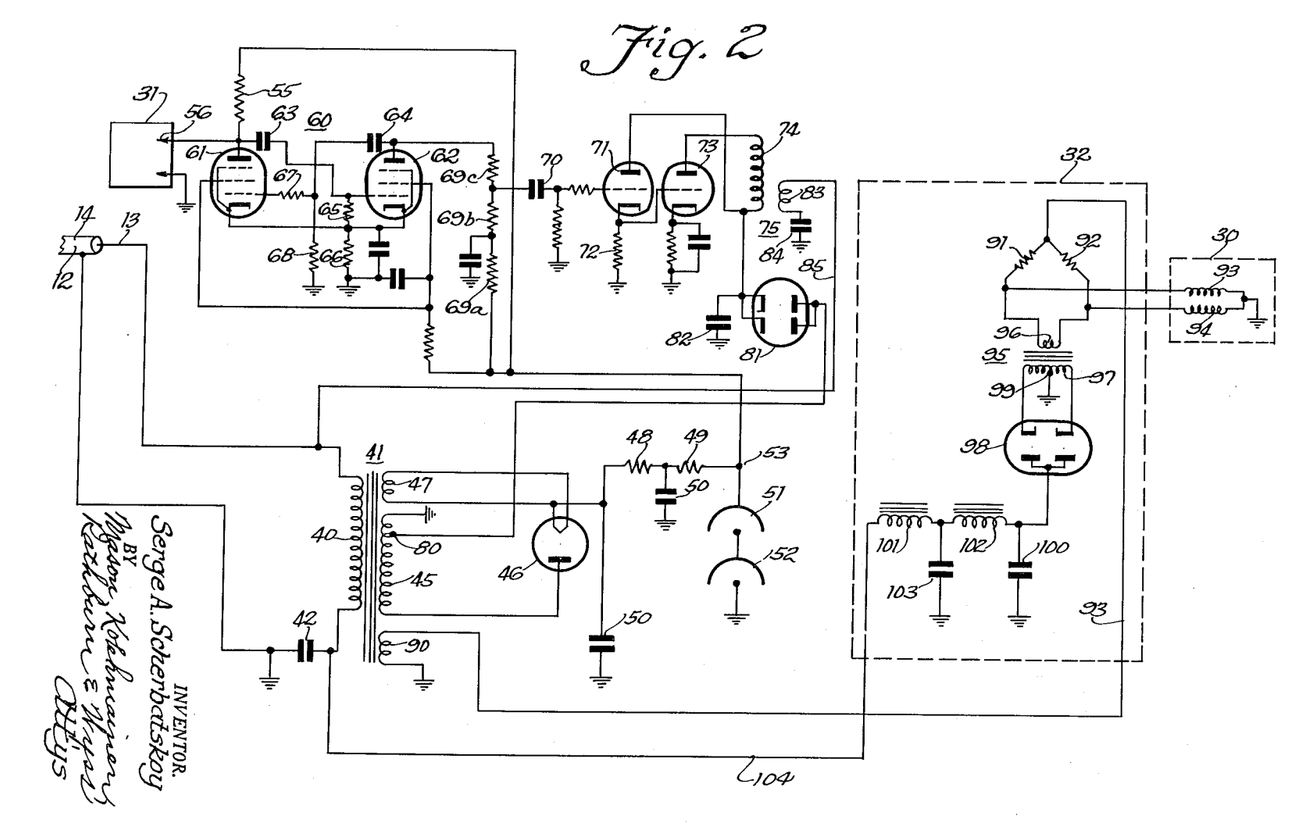
Fig. 2 schematically illustrates the subsurface equipment of the present improved logging apparatus.

Referring now more particularly to Fig. 2, the circuit arrangement of the subsurface equipment 10 shown in Fig. 1 is there illustrated. As shown, the center conductor 13 of the cable 12 is connected to one end of the primary winding 40 of a power transformer 41, the other end of the winding 40 being connected through the isolating condenser 42 to the grounded outer sheath 14 of the cable 12. Alternating current supplied by the generator 20 at the surface is thus supplied through the capacitor 21 and the cable 12 to the primary winding 40 of the power transformer of the subsurface unit, the condenser 42 being provided to isolate the collar finder circuits which are described in more detail hereinafter from ground. In this connection it will be understood that the impedance of the condenser 42 at the frequency of the generator 21, which frequency may be in the order of four hundred cycles, is relatively small as compared with the impedance of the primary winding 40, so that the major portion of the generator voltage is produced across the transformer 41. To provide a high voltage supply for the anode of the Geiger counter 31, the power transformer 41 is provided with a high voltage winding 45, one end of which is connected to ground and the other end of which is connected to the anode of a high voltage rectifier tube 46. The transformer 41 is also provided with a low voltage secondary winding 47 which is utilized to supply filament power to the rectifier 46. Rectified high voltage produced at the filament of the rectifier 46 is filtered by means of a circuit including the resistors 48 and 49 and the condensers 50 and is then supplied to a pair of series connected gaseous discharge regulator tubes 51 and 52, which are connected between one end of the resistor 49 and ground and perform the function of maintaining a substantially constant potential level at the terminal point 53. The regulated high voltage thus produced at the terminal point 53 is supplied through an anode load resistor 55 to the anode 56 of the Geiger counter 31, the cathode of the Geiger counter 31 being connected to ground to complete the circuit.

For the purpose of converting the gamma ray response of the counter 31 into pulses of uniform amplitude and duration, the counter is connected directly to control a modified multivibrator circuit indicated generally at 60, which may be regarded as operating to quench the Geiger counter upon the occurrence of each discharge kick produced by the counter. This quenching circuit is essentially a one-shot multivibrator, sometimes referred to as a "univibrator," and functions to amplify the impulses produced by the Geiger counter, as well as to provide a series of output pulses of substantially uniform amplitude. The circuit 60 comprises two pentode type tubes 61 and 62, the anodes of which are respectively cross-coupled to the control grids of the opposite tubes through the condensers 63 and 64. Anode potential is supplied to the tube 62 through the resistors 69a, 69b and 69c, and to the tube 61 through the load resistor 55 which feeds the counter 52. The control grid of the tube 62 is connected to the tube cathode through the resistor 65 and the cathodes of both of the tubes 61 and 62 are connected through the common cathode resistor 66 to ground. With this circuit arrangement, the tube 62 is normally conductive. The control grid of the tube 61 is connected to ground through the resistors 67 and 68 so that with the tube 62 conducting heavily, the cathode of the tube 61 is normally held sufficiently positive with respect to the control grid thereof to maintain the tube 61 non-conductive. However, when a gamma ray causes the counter to discharge and draw anode current through the load resistor 55, the voltage at the anode of the tube 61 decreases to produce a sharp negative voltage pulse which is applied to the control grid of the tube 62 through the condenser 63 and operates to cut off current flow through the tube 62. The resulting decrease in the voltage drop across the resistors 69a, 69b and 69c and rise in positive potential at the anode of the tube 62 causes current flow through the condenser 64 and the resistor 68, which serves to decrease the bias on the control grid of the tube 61 so that this tube starts to conduct. Current conduction through the tube 61 serves to maintain the voltage drop across the anode resistor 55. However, after the charge on the condenser 63 leaks off through the associated circuit components, the tube 62 again starts to conduct to lower the potential at its anode and hence increase the bias on the grid of the tube 61 until the latter is again rendered non-conductive. Thus the circuit 60 is restored to its normal condition.

As will be apparent from the above explanation, the negative kicks produced at the anode of the Geiger counter 31 merely serve to trigger the univibrator 60, so that a positive pulse is produced at the anode of the tube 62 each time this tube is rendered non-conductive in response to detection of a gamma ray by the counter 31. These pulses are of uniform amplitude and width, and have a rate of occurrence proportional to the intensity of the gamma rays passing through the Geiger counter. They are supplied through a resistance-capacitance coupling circuit, including the coupling condenser 70, to the control grid of a cathode follower tube 71, and appear with the same polarity across the cathode load resistor 72 of this tube. The positive pulses thus developed across the resistor 72 are supplied to the control grid of a triode amplifier tube 73, and appear as amplified pulses of opposite polarity across the primary winding 74 of the output transformer 75. Anode potential for the anodes of the tubes 71 and 73 is supplied from a half-wave rectifier comprising a condenser 82 and the twin diode 81, this circuit being excited from a tap 80 on the high voltage secondary winding 45 of the transformer 40. The transformer 75 is provided for the purpose of impressing the amplified counter pulses from the anode of the amplifier 73 upon the coaxial cable 12 and to this end is provided with a low impedance secondary winding 83, one end of which is connected through the condenser 84 to ground, and the other end of which is connected directly to the inner conductor 13 of the cable 12 over the conductor 85.

To summarize with respect to the operation of the radioactivity detecting components of the subsurface unit 10, it will be understood from the foregoing explanation that the pulses produced by the counter 31 in response to gamma rays impinging upon the counter are standardized in amplitude and width by the univibrator 60, and are further amplified in the tube 73 so as to provide across the secondary winding 83 of the coupling transformer 75 sharp pulses of negative polarity. These pulses are superimposed upon the four hundred cycle alternating current wave supplied to the cable 12 by the generator 20, and accordingly, are transmitted to the surface equipment 11.

In order to provide correlated indications of the depth to which the subsurface unit 10 is lowered, the collar finder circuit 32 is provided which is arranged to be energized from the cable 12 and functions to supply a variable unidirectional voltage through this cable to the collar finder detector circuit 23 at the surface. To supply operating current to the collar detector circuit 32, the power transformer 41 is provided with an additional secondary winding 90, which may also be used to supply filament power to the tubes of the unit 10, one end of which is grounded and the other end of which is connected over the conductor 93 to the junction point between two resistors 91 and 92 having equal resistance values. These resistors form two arms of a bridge circuit, the other arms of which comprise identical collar finder coils 93 and 94, the coils 93 and 94 being connected in series across the resistors 91 and 92, and the junction point between these coils being connected to ground to complete the low voltage alternating current circuit. An output voltage is taken from the above described bridge circuit by means of the coupling transformer 95, the primary winding 96 of which is connected between the opposite diagonal points of the bridge circuit. The secondary winding 97 of the transformer 95 is connected to a full wave rectifier 98 and is provided with a grounded center tap 99 so as to produce a voltage across the filter condenser 100 which is negative with respect to ground. The rectified voltage thus produced across the condenser 100 is smoothed in a filter circuit including the inductances 101, 102, and the condenser 103, so that a substantially unidirectional voltage is supplied over the conductor 104 and through the primary winding 40 of the power transformer to the inner conductor 13 of the cable 12.

Briefly considering the operation of the above described collar finder circuit 32, it will be evident from the foregoing description that the elements 91 to 94, inclusive, comprise a bridge circuit, and if the impedances of the collar finder coils 93 and 94 are equal, the bridge is balanced and no voltage is produced across the primary winding 96 of the coupling transformer 95. The above described situation obtains when the coils 93 and 94 are located adjacent a ferrous metal casing or pipe of uniform wall thickness. However, as the coils move past a casing collar, one of the coils 93 or 94 is influenced by the collar before the other coil, and there is thus produced a momentary unbalance of the impedances of the two coils. As a consequence a voltage is produced across the primary winding 96 which is rectified by the rectifier 98 so as to provide a unidirectional voltage deflection, or kick, which is supplied through the cable 12 to the surface equipment 11. In this connection it will be understood that the unidirectional voltage kicks produced as described above by the collar finder circuit 32 are isolated from the alternating current power circuit by means of the condensers 42 and 21.

Figure 3:
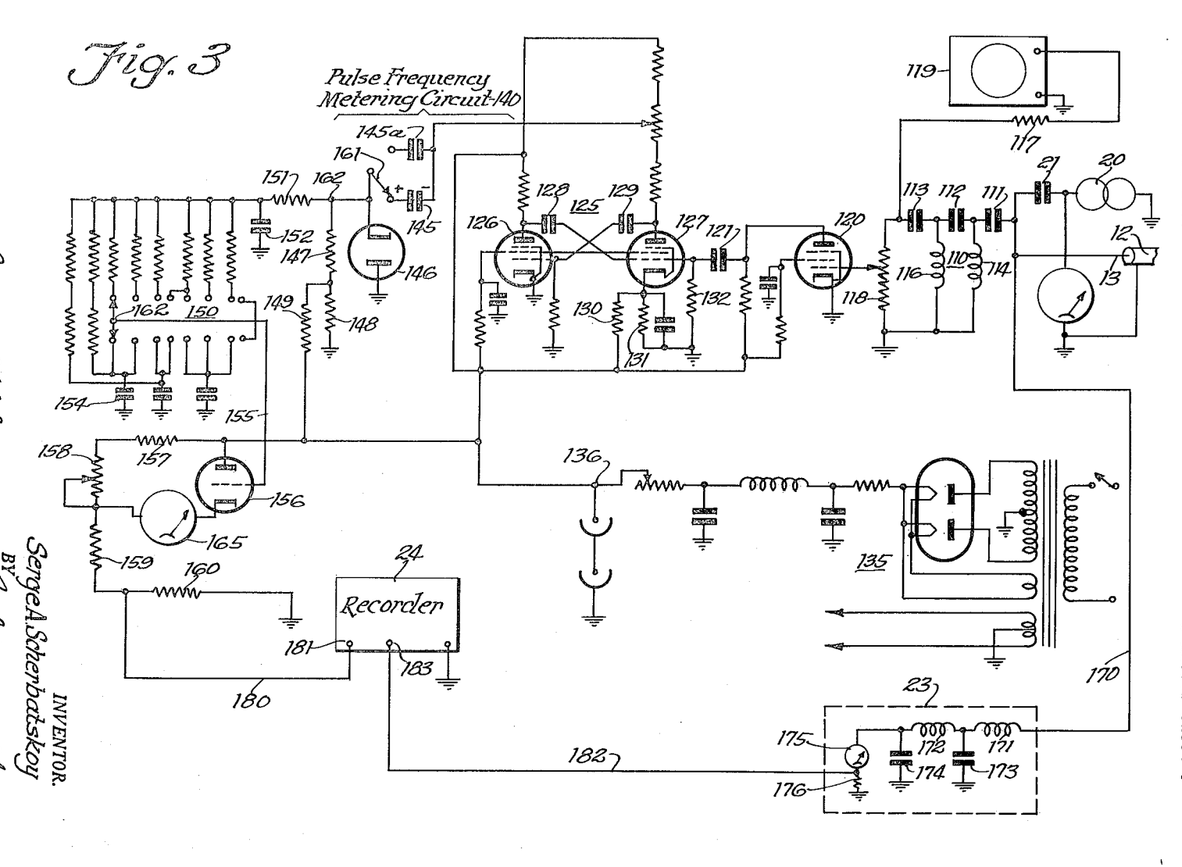
Fig. 3 schematically illustrates the surface equipment of the present improved logging apparatus.

At the surface the above described radioactivity and collar position signals are detected and recorded by means of the apparatus shown in detail in Fig. 3 of the drawings. As there illustrated, the negative pulses supplied to the cable 12 by the gamma ray detecting components of the subsurface equipment 10 in the manner described above are separated from the four hundred cycle power frequency by the high pass filter indicated generally at 110. More specifically, the inner conductor 13 of the cable 12 is connected to a plural section high pass filter comprising the series connected condensers 111, 112, and 113 and the shunt connected inductances 114 and 116. The voltage produced at the output side of the filter 110 is supplied to the potentiometer 118 and the arm of the potentiometer 118 is connected to the control grid of an amplifier tube 120. In the event that a visual check of the filtered wave form is desired, an oscilloscope 119 may be connected across the potentiometer 118 through an isolating resistor 117 in the manner shown. The negative counter pulses which are supplied to the control grid of the tube 120 through the filter circuit 110 are amplified and inverted in polarity through this tube and supplied through a coupling condenser 121 to a one shot multivibrator indicated generally at 125. This multivibrator comprises a pair of pentode type tubes 126 and 127, the anodes of which are cross-coupled to the control grids of the opposite tubes through the coupling condensers 128 and 129. Anode potentials are supplied to the tubes 120 and 127 by any suitable means such as the conventional power supply circuit indicated generally at 135, which power supply circuit may be excited from any suitable source of alternating current and provides a regulated unidirectional voltage at the output terminal 136 thereof. The cathode of the tube 126 is connected directly to ground and the cathode of the tube 127 is biased to a positive potential through a bleeder network including the resistors 130 and 131. The control grid of the tube 127 is connected to ground through the grid resistor 132 so that the tube 127 is normally biased beyond cutoff by the positive bias impressed upon the tube cathode by the described bleeder circuit. On the other hand, the tube 126 normally conducts heavily due to the lack of bias between the cathode and control grid thereof. The circuit 125 operates in exactly the same manner as the univibrator circuit 60, described above. It will be understood, therefore, that each time an amplified pulse of positive polarity and representative of detected gamma ray is supplied to the control grid of the tube 127 from the tube 120, the tube 127 is rendered conductive and the tube 126 is rendered non-conductive for an interval determined by the time constant of the circuit. As a consequence, negative pulses of uniform amplitude and width are produced in the anode circuit of the tube 127 at the rate of one such pulse for each pulse delivered to the circuit 125 from the amplifier tube 120.

In order to provide an indication of the rate of occurrence of the pulses developed by the multivibrator 125 and hence of the intensity of the gamma radiations intercepted by the counter 31, a pulse frequency metering circuit indicated generally at 140 is provided. This circuit utilizes a portion of the negative multivibrator pulses produced at the anode of the tube 127 to control the charging of a condenser circuit having an output wave the average value of which is proportional to the frequency of occurrence of the counter pulses. More specifically, the negative multivibrator pulses from the tube 127 are applied through a small condenser 145 to the cathode of a shunt rectifier 146 in the form of a diode which is paralleled by two series connected resistors 147 and 148 having the junction point therebetween connected through the resistor 149 to the anode current supply terminal 136.

In the frequency metering circuit 140, the condenser 145 is charged through the rectifier 146 during the negative portions of the multivibrator pulses supplied from the tube 127 and during these intervals the condenser 145 acquires a charge of the polarity shown in Fig. 3. During on-pulse intervals the rectifier 146 is conductive and accordingly the output terminal 162 of the circuit 140 is clamped substantially to ground potential for the duration of the multivibrator pulses through the extremely low impedance of the conductive rectifier 146. During each off-pulse interval, the condenser 145 discharges through the series path including the resistors 147 and 148 and the anode load resistance of the tube 127, so that the voltage at the output terminal 162 decreases exponentially in accordance with the time constant of the condenser 145 and the resistance of the series discharge path. In this connection it will be understood that during off-pulse intervals the rectifier 146 is non-conductive due to the fact that the cathode potential of this rectifier is raised above ground by virtue of the charge stored in the condenser 145 so that the shunting effect of this rectifier is not present during off-pulse intervals.

If the multivibrator pulses, which coincide in time with the radiation detector pulses transmitted from the subsurface unit, are relatively far apart, the condenser 145 will discharge through the associated series path resistance so that the voltage at the output terminal 162 will fall to a minimum value before the next pulse. With this operation the average value of the pulse wave form produced as described above at the output terminal 162 will have a minimum value. However, if the frequency of the multivibrator pulses increases, the average value of the wave form produced at the output terminal 162 will increase in direct proportion to the frequency of occurrence of the multivibrator pulses. Accordingly, the frequency metering circuit provides an output voltage the average value of which is proportional to the frequency of occurrence of the multivibrator pulses supplied thereto. In this connection is it noted that the size of the condenser 145 is of considerable importance in that the condenser should not be so large as not to discharge at all during the shortest off-pulse interval. Thus, if the condenser 145 does not discharge appreciably during the shortest off-pulse interval, the voltage thereacross is built up to a relatively high steady state value with the result that the average value of the voltage at the output terminal 162 remains at a maximum positive value and does not vary with the frequency of occurrence of the counter pulses as desired. Accordingly, a given condenser 145 has an upper frequency limit above which the circuit 140 will not provide an output voltage which is proportional to frequency.

It will also be understood that the average value of the output wave at the terminal 162 increases in a positive sense as the frequency of occurrence of the multivibrator pulses increases due to the fact that the rectifier 146 clamps the negative-most portions of the multivibrator pulses to ground potential during the conductive periods thereof.

In order to increase the frequency range of the frequency metering circuit 140 so that the circuit will respond to counter pulses having widely different rates of occurrence there is provided a second charging condenser 145a which may be substituted for the condenser 145 by means of the selector switch 161. It will be understood that the condenser 145a has a capacity substantially different from the capacity of the condenser 145 so that the time constant of the series circuit is substantially different when the condensers 145 and 145a are respectively included therein.

While the output wave form from the frequency metering circuit 140 has an average value which varies in accordance with the frequency of occurrence of the multivibrator pulses, it also includes relatively high frequency components which are unsuitable for application to the indicating and recording apparatus. Accordingly, an adjustable integration circuit 150 is provided which integrates the output of the frequency metering circuit 140 so as to provide a substantially unidirectional voltage, the amplitude of which is proportional to the frequency of occurrence of the counter pulses supplied to the surface equipment. More specifically, the filter circuit comprises a first filter section including a series resistor 151 and a shunt condenser 152 and a second filter section comprising a series resistor 153 and a shunt condenser 154. The smoothing action of the filter circuit 150 may be varied by means of the two pole eight position step switch 162 so that the output wave from the frequency metering circuit is filtered to remove the high frequency components therefrom without reducing excessively the overall amplitude of this output wave. Thus, the step switch 162 may be employed to select the particular values of the resistor 153 and the condenser 154 which provide optimum filtering or smoothing out of the high frequency components of the output wave from the frequency metering circuit while reducing the average value of this wave by a minimum amount.

The variable unidirectional voltage thus produced at the output side of the filter circuit 150 is applied directly to the control grid of a cathode follower type metering tube 156. The anode of the meter tube 156 is connected to the anode current supply terminal 136 and through a series circuit including the resistor 157, the potentiometer 158, and the resistors 159 and 160 to ground. The cathode of the metering tube 156 is connected through a frequency meter 165 to the junction point of the potentiometer 158 and the resistor 159. With this circuit arrangement, the metering tube 156 acts as an amplifier which provides essentially no voltage amplification but substantial current amplification. Accordingly, the output of the metering tube 156 is of extremely low impedance and is suitable for energizing the frequency meter 165 and for impressing the variable unidirectional voltage derived from the integration circuit 150 upon the low impedance input circuit of the recorder 24. The cathode of the metering tube 156 is operated at a positive potential with respect to ground by an amount equal to the voltage drop across the series resistors 159 and 160. The control grid of the tube 156 is conductively connected through the resistors 153, 151 and 147 to the junction point of the voltage divider resistors 149 and 148 connected between the anode current supply terminal 136 and ground. Accordingly, the control grid of the tube 156 is biased positively above ground potential by an amount equal to the voltage drop across the resistor 148. The voltage drop across the resistor 148 is preferably relatively small, i. e., of the order of two volts, and the potential of the cathode of the meter tube 146 may be varied by adjusting the potentiometer 158 so that the meter tube 146 draws minimum current in the absence of pulses from the multivibrator 125. To summarize, it will be apparent that when the multivibrator 125 is triggered in accordance with counter pulses transmitted from the subsurface unit 10, the frequency metering circuit 140 provides an output wave the average value of which is equal to the frequency of occurrence of the multivibrator pulses, which output wave is filtered and applied to the control grid of the metering tube 156. If the counter pulses are relatively far apart, a relatively small positive potential is applied to the control grid of the tube 146 and the meter 165 registers a correspondingly small deflection. On the other hand, if the counter pulses are relatively close together, the average value of the frequency meter output wave increases positively causing a corresponding increase in the deflection of the meter 165. Corresponding variations in the amplitude of the wave trace produced by the recorder 24 are produced in an obvious manner.

The collar position signals supplied by the subsurface equipmnet 10 to the cable 12 are transmitted over the conductor 170 to the collar finder detector circuit 23. The collar finder detector circuit comprises a low pass filter, including the series inductance elements 171 and 172 and the shunt capacitive elements 173 and 174, which acts to pass the unidirectional voltage kicks produced by the collar finder circuit 32 when the subsurface unit traverses a collar and to reject the 400 cycle supply voltage and the high frequency counter pulses. The output signal delivered by the low pass filter circuit is connected to a collar finder meter 175 which acts to produce a visual indication of the casing collars traversed by the coils 93 and 94 of the down-hole unit 10.

The above described feature of providing a conductive connection from the down-hole cable to the collar-finder detector circuit 23 has the important advantage of permitting an indication of collar location while the down-hole unit 10 is standing still. Thus, the traversal of a casing collar produces an unbalance in the coils 93 and 94, which, if the down-hole unit 10 is being lowered steadily, causes a unidirectional voltage kick. However, if the unit 10 is stationary and is positioned near a casing collar, the coils 93 and 94 will remain unbalanced to produce a unidirectional voltage output from the bridge circuit which is conveyed to the surface and produces an indication on the meter 175. It will also be noted that an indication of collar location is obtained without conflicting with the transmission of high frequency counter pulses and 400 cycle supply voltage over the same cable due to the fact that the D. C. collar finder system is isolated from the remaining units of the system.

As indicated above, the recorder 24 is provided in order to obtain a permanent record of both the radioactivity signals and the collar position signals. This recorder is supplied with a signal voltage representative of the intensity of the detected gamma rays by means of the resistor 160. Thus, the junction point of the resistors 159 and 160 is connected through the conductor 180 to the input terminal 181 of the recorder 24. Also, the recorder 24 is supplied with collar position signals by means of the voltage produced across the resistor 176 in the collar detector circuit 23, which voltage is supplied over the conductor 182 to the input terminal 183 of the recorder 24. Since the records produced in response to the voltages supplied to the input terminals 182 and 183 of the recorder are in side-by-side relationship longitudinally of the record strip 24a, the collar position signal trace provides a reliably accurate indication of the depth at which any segment of the gamma ray intensity trace is produced.

To summarize with respect to the general mode of operation of the logging system shown in Fig. 1, without considering in detail the circuit arrangements of the units shown in block diagram form in Figs. 2 and 3, the gamma ray detector 31 produces sharp "kicks" or pulses in response to the interception of gamma rays as the unit 10 traverses the borehole and the rate of occurrence of these "kicks" or pulses is a measure of the intensity of the intercepted radiation. The pulses produced by the gamma ray detector 31 are standardized in amplitude and width and amplified in the circuit 33 and are transmitted over the cable 12 to the surface equipment 11. At the surface these pulses are separated from the other signals of the logging system by means of a high pass filter in the gamma ray pulse detector circuit 22 and are further amplified and standardized in amplitude and width and applied to the recorder 24.

As explained in detail above, the collar finder coils 30 are positioned at the lower extremity of the subsurface unit 10 and are balanced when the unit 10 is traversing casing of uniform wall thickness. However, when a coupling collar is traversed, one of the coils is influenced by the collar before the other coil and there is momentary unbalance of the inductances of these coils. The collar finder coils are in a bridge circuit so that an unbalance in the inductances of these coils effects a signal output from the bridge circuit which is rectified and impressed upon the cable 12 in the form of unidirectional voltage kicks. These voltage kicks, which occur whenever the subsurface unit 10 passes a casing collar, are separated from the other signals of the logging system by means of a low pass filter in the collar finder detector circuit 23. The unidirectional voltage kicks thus separated are supplied to the recorder where they provide a log of the depth of the subsurface unit which is correlated with the radioactivity log. In order that both of the above described signals may be supplied over the same cable 12 which supplies the alternating current power from the generator 20 to the subsurface unit, the collar finder circuit described above is isolated from the alternating current power circuit at the surface by means of the condenser 21 and also in the subsurface unit 10.

Figure 4:
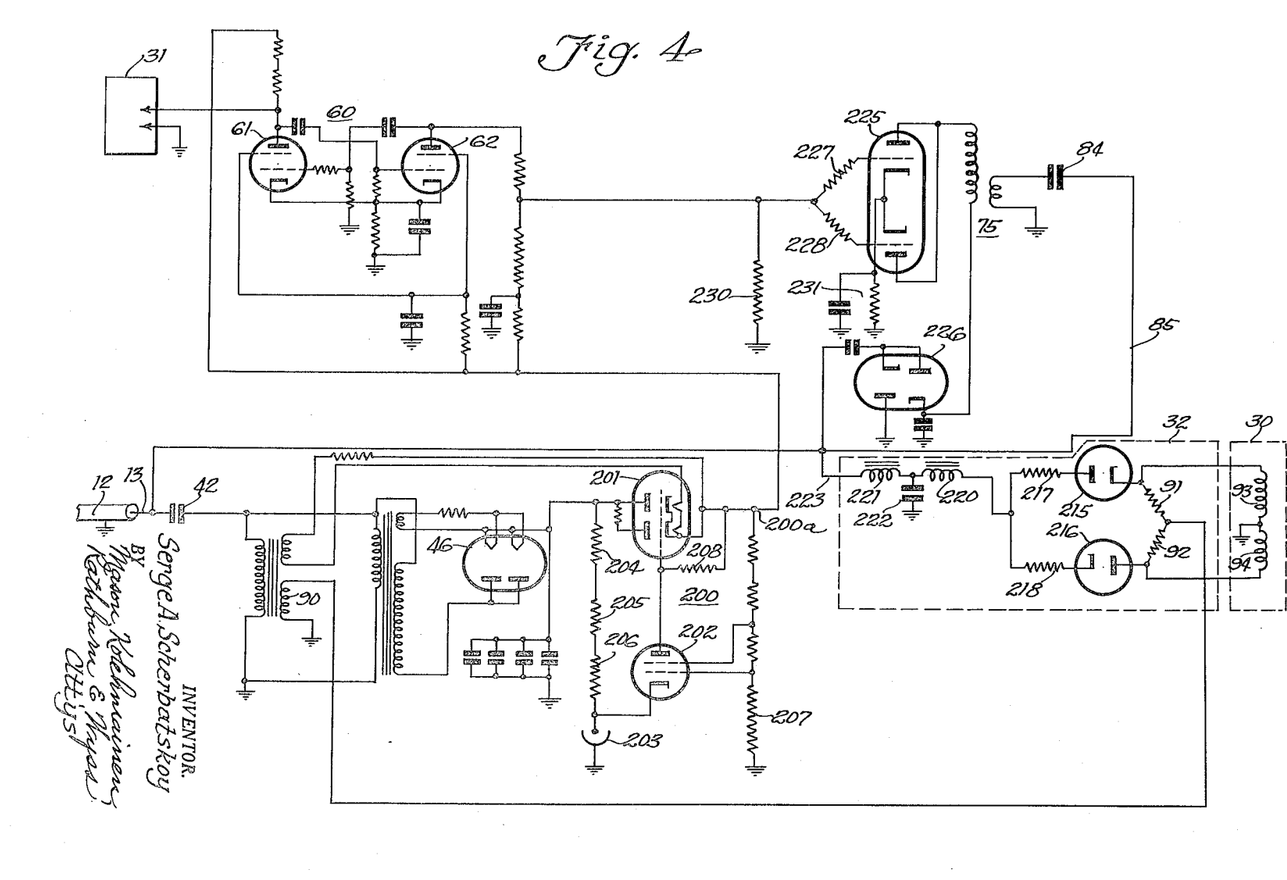
Fig. 4 schematically illustrates an alternative form of subsurface equipment which may be employed in the well logging apparatus shown in Fig. 1.

Referring now more particularly to the alternative embodiment of the subsurface unit 10 illustrated in Fig. 4, certain portions of the circuit there shown are identical with those employed in the subsurface unit shown in Fig. 2, and accordingly, the same reference numerals have been employed to identify corresponding elements of the two circuits. In the circuit of Fig. 4 a different type of high voltage regulator is employed to provide the high voltage necessary for the univibrator circuit 60 and the anode of the Geiger counter tube 31. Thus, rectified voltage produced at the filament of the rectifier 46 is supplied to a series type voltage regulator circuit indicated generally at 200, which includes the series regulator tube 201 and the control tube 202. The voltage regulator circuit 200 is of the type in which the control tube 202 varies the flow of current through the series regulator tube 201 in accordance with changes in the output voltage, the cathode of the control tube 202 being connected to the stabilized reference potential of a gaseous regulator tube 203, which in turn is connected across the high voltage supply circuit in series with the resistors 204, 205 and 206. As the output voltage at the terminal 200a changes, the resulting voltage change across the resistor 207 varies the flow of current through the tube 202, and hence through the anode load resistor 208 so as to vary the control grid potential of the series regulator tube 201 and the anode-cathode drop thereacross in the correct sense to reduce the magnitude of the voltage change at the output terminal 200a. Thus a voltage regulating action is achieved which has the effect of maintaining the voltage level at the terminal 200a substantially constant.

The collar finder circuit 32 of the Fig. 4 circuit is generally similar to the collar detector circuit shown in Fig. 2 and comprises a bridge circuit which includes the collar locating coils 93 and 94 in two of the arms thereof. In the Fig. 4 circuit, however, the output voltage is taken from the bridge circuit without the use of a coupling transformer. This is accomplished by employing a rectifier circuit including the rectifiers 215 and 216 which are connected in series with the resistors 217 and 218 across one diagonal of the collar locating bridge circuit. The rectified voltage which is produced at the junction point of the resistors 217 and 218 is then filtered in the filter circuit including the series inductances 220 and 221 and the shunt condenser 222, and the signal output voltage from the filter circuit is connected to the central conductor 13 of the cable 12 over the conductor 223. One further modification of the circuit of Fig. 4 consists in employing a single stage of amplification for the pulses produced by the univibrator circuit 60. Thus, a dual triode tube 225 is supplied with anode potential from the voltage rectifier circuit including the twin diode rectifier 226. The control grids of the two sections of the tube 225 are connected together through resistors 227 and 228 and are further connected to ground through the common grid resistor 230. A common cathode biasing circuit 231 supplies cathode bias for the tube 225. A coupling transformer 75 is again employed in the anode circuit of the tube 225 to transfer the pulses developed by the univibrator circuit 60 and amplified in the tube 225 to the central conductor of the cable 12.

Figure 5:
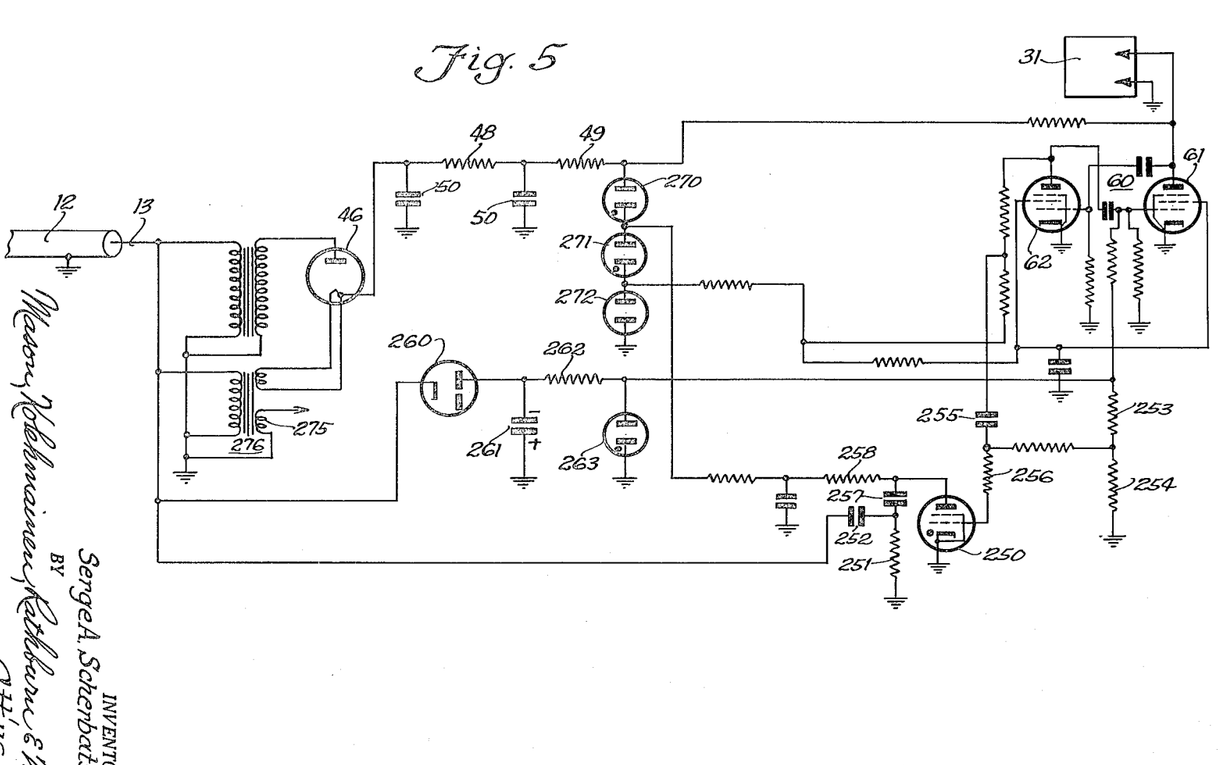
Fig. 5 illustrates another alternative arrangement of the subsurface equipment which may be employed in the logging apparatus shown in Fig. 1.

Referring now to Fig. 5 a further alternative embodiment of the subsurface equipment 10 is there illustrated. The subsurface equipment shown in Fig. 5 employs a univibrator 60 which is triggered from the Geiger counter tube 31 in a manner entirely similar to that described in connection with Figs. 2 and 4. However, the uniform pulses produced by the multivibrator 60 in response to pulses from the counter 31 are supplied to a pulse shaping and matching circuit including the gas tube 250. The gas tube 250 is provided with an anode circuit which is arranged to supply negative pulses across the load resistor 251 thereof, which pulses are capacitively coupled through the condenser 252 to the center conductor of the cable 12. The control grid of the gas tube 250 is normally biased negatively by means of the bleeder network including the resistors 253 and 254, which are connected from a regulated source of negative potential to ground. Positive pulses which are produced at the anode of the tube 62 are supplied through the coupling condenser 255 and the series limiting resistor 256 to the control grid of the gas tube 250. The anode of the tube 250 is connected through the coupling condenser 257 and the output resistor 251 to ground and is further connected to the anode current supply source through the resistor 258.

Referring to the operation of the above described pulse shaping and matching circuit, negative pulses which are produced at the anode of the tube 61 control the action of the univibrator 60 so that positive pulses are produced at the anode of the tube 62 which are of uniform amplitude. These pulses are produced in a manner which will be clearly apparent from the preceding explanation. The positive pulses thus developed at the anode of the tube 62 are differentiated in the network including the condenser 255, and the positive going portion of each differentiated pulse causes the gas tube 250 to fire. When the tube 250 fires, the condenser 257 is rapidly discharged through the tube, the flow of current through the resistor 251 causing a negative pulse to appear across this resistor. The pulse thus produced across the resistor 251 is coupled through the condenser 252 to the cable conductor 13 and is transmitted over the cable 12 to the surface equipment 11.

For the purpose of supplying the negative bias potential required to operate the multivibrator 60 and the gas tube 250 a rectifier circuit is provided which includes the rectifier tube 260, the filter condenser 261, the series limiting resistor 262, and the gas regulator tube 263. The cathode of the rectifier tube 260 is conductively connected to the inner conductor of the cable 12 so that a rectified potential which is negative with respect to ground, appears across the condenser 261. The regulator tube 263 operates to stabilize the amplitude of the negative bias potential in a manner which will be readily apparent to those skilled in the art. High voltage for the anode of the counter tube 31 is supplied from a half wave rectifier circuit including the tube 46 in substantially the same manner as in the circuit shown in Fig. 2. Three series connected gaseous regulator tubes 270, 271 and 272 are bridged across the output terminals of this circuit to act both as a voltage amplitude regulator and as a voltage divider for supplying operating potentials to other portions of the circuit. Thus, the junction point between the tubes 270 and 271 is employed to supply anode potential to the gas tube 250. Likewise, the junction point between the tubes 271 and 272 is the potential take-off point for the screen electrodes of the tubes 61 and 62 of the univibrator 60, and the anode of the tube 62. It will be understood that a collar finding circuit similar to that shown in either Fig. 2 or Fig. 4 may be employed in the subsurface unit disclosed in Fig. 5 to transmit collar position signals over the cable 12 to the surface equipment 11. In such case, the secondary winding 275 of the filament transformer 276 may be utilized as a source of alternating current for exciting the bridge type collar finder circuit.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. A radioactivity and collar position logging system, comprising a subsurface unit, a single conductor cable for lowering said unit into a borehole, radiation detector means positioned within said unit and operative to produce pulses of non-uniform amplitude and duration in response to radiations intercepted thereby, means included in said unit for converting said pulses into pulses of uniform amplitude and duration, collar finder means independent of said radiation detector means and positioned within said unit and operative to produce unidirectional voltage kicks in response to traversal of casing collars by said unit, means including the single conductor of said cable for supplying alternating current power to said unit, means for transmitting both said uniform pulses and said voltage kicks over the single conductor of said cable to the earth's surface, and surface equipment including a low pass filter for separating said voltage kicks from said uniform pulses and the voltage of said power supplying means and a high pass filter for separating said uniform pulses from said voltage kicks and the voltage of said power supplying means, means for converting said separated pulses into a voltage having an amplitude proportional to the rate of occurrence of said pulses, and means for recording both said separated voltage kicks and said voltage to provide correlated radioactivity and collar position information.

2. A radioactivity and collar position logging system, comprising a subsurface unit, a single conductor cable for lowering said unit into a borehole, radiation detector means positioned within said unit and operative to produce pulses in response to radiations intercepted thereby, collar finder means independent of said detector means and positioned within said unit and operative to produce unidirectional voltage kicks in response to traversal of casing collars by said unit, means for supplying alternating current power over the single conductor of said cable to said unit, means for transmitting both said radiation pulses and said voltage kicks over the single conductor of said cable to the earth's surface, and surface equipment including a high pass filter for isolating the radiation pulses supplied thereto over said cable conductor from the alternating current power voltage and the voltage kicks present on said conductor, means for converting said separated radiation pulses into pulses of uniform amplitude and duration, means for converting said uniform amplitude pulses into a signal voltage having an amplitude proportional to the rate of occurrence of said radiation pulses, means for isolating the voltage kicks supplied to said surface equipment over said cable conductor from the alternating current power voltage and the radiation detector pulses present on said cable, and means for recording both said signal voltage and said isolated voltage kicks to provide correlated radioactivity and collar position information.

3. A radioactivity and collar position logging system, comprising a subsurface unit, a single conductor cable for lowering said unit into a borehole, radiation detector means positioned within said unit and operative to produce pulses of non-uniform amplitude and duration in response to radiations intercepted thereby, means included in said unit for converting said pulses into pulses of uniform amplitude and duration, collar finder means independent of said detector means and positioned within said unit and operative to produce unidirectional voltage kicks in response to traversal of casing collars by said unit, means including the single conductor of said cable for supplying alternating current power to said unit, means for transmitting both said uniform pulses and said voltage knicks over the single conductor of said cable to the earth's surface, and surface equipment including a low pass filter for separating said voltage kicks from said uniform pulses and the voltage of said power supplying means and a high pass filter for separating said uniform pulses from said voltage kicks and the voltage of said power supplying means, means at the earth's surface for converting said separated pulses into pulses of uniform amplitude and duration, means responsive to the pulses produced by said last-named means for producing a voltage having an amplitude which varies in accordance with the rate of occurrence of said last-named pulses, and means for recording both said separated voltage kicks and said voltage to provide correlated radioactivity and collar position information.

4. A radioactivity and collar position logging system comprising a subsurface unit, a single conductor cable for lowering said unit into a borehole, radiation detector means positioned within said unit and operative to produce pulses of non-uniform amplitude and duration in response to radiations intercepted thereby, a one-shot multivibrator excited by said pulses and operative to convert the same into sharp pulses of uniform amplitude and duration, collar finder means positioned within said unit and operative to produce unidirectional voltage kicks in response to traversal of casing collars by said unit, means including the single conductor of said cable for supplying alternating current power to said unit, means for transmitting both said sharp pulses and said voltage kicks over the single conductor of said cable to the earth's surface, and surface equipment including a low pass filter for separating said voltage kicks from said sharp pulses and the voltage of said power supply means and a high pass filter for separating said sharp pulses from said voltage kicks and the voltage of said power supply means, a one-shot multivibrator excited by said separated pulses and operative to produce corresponding pulses of uniform amplitude and duration, a condenser and rectifying device connected in series, means for supplying said last-named pulses to said series connected condenser and rectifying device, means including a shunt impedance connected across said rectifying device for deriving therefrom an output voltage having an amplitude which varies in accordance with the rate of occurrence of said last-named pulses, and means for recording both said voltage kicks and said output voltage to provide correlated radioactivity and collar position information.

5. In a radioactivity logging system, the combination of, a radiation detector arranged to be moved longitudinally of a borehole, means for transmitting to the earth's surface pulses of relatively short duration in response to radiations intercepted by said detector, a condenser and rectifying device connected in series, means responsive to said pulses for supplying corresponding pulses to said series connected condenser and rectifying device, means including a shunt impedance connected across said rectifying device for deriving therefrom an output wave having an amplitude proportional to the rate of occurrence of said pulses, said last-named means including a plural section resistance-capacitance network for integrating the voltage produced across said impedance thereby to remove the high frequency components of said pulses from said output wave.

6. In a radioactivity logging system, the combination of, a radiation detector arranged to be moved longitudinally of a borehole, means for transmitting to the earth's surface pulses of relatively short duration in response to radiations intercepted by said detector, a condenser and rectifying device connected in series, means responsive to said pulses for supplying corresponding pulses to said series connected condenser and rectifying device, means including a shunt load impedance connected across said rectifying device for deriving therefrom an output wave having an average value proportional to the rate of occurrence of said pulses, said last-named means including means for integrating the voltage produced across said impedance, and means for varying the amount of integration effected by said integrating means, thereby to provide optimum smoothing of said output wave.

7. In a radioactivity logging system, the combination of, a radiation detector arranged to be moved longitudinally of a borehole, means for transmitting to the earth's surface pulses of relatively short duration in response to radiations intercepted by said detector, a condenser and rectifying device connected in series, means responsive to said pulses for supplying corresponding pulses to said series connected condenser and rectifying device, means including a shunt load impedance connected across said rectifying device for deriving therefrom an output wave having an amplitude proportional to those pulses having a rate of occurrence less than a predetermined maximum value, the time constant of said condenser and load impedance being sufficiently small to permit a discharge of said condenser in the intervals between said last named pulses, and means for adjustably changing the value of said time constant, thereby to vary said predetermined maximum value.

8. In a radioactivity logging system, the combination of, a radiation detector arranged to be moved longitudinally of a borehole, means responsive to radiations intercepted by said detector for transmitting pulses to the earth's surface which may vary slightly in amplitude and duration, means for converting said pulses into pulses of uniform amplitude and duration, a condenser and rectifying device connected in series, means for supplying said pulses of uniform amplitude and duration to said series connected condenser and rectifying device, means including a load impedance shunting said rectifier for deriving from said series connected condenser and rectifying device an output voltage having an amplitude which varies in accordance with the rate of occurrence of said pulses, said last-named means including an integration network for integrating the voltage across said impedance to remove the high frequency components of said pulses from said output wave, and means for varying the time constant of said network to provide optimum smoothing of said output wave.

References Cited in the file of this patent

UNITED STATES PATENTS

| 2,316,576 | Fearon | Apr. 13, 1943 |
| 2,383,478 | Friedman et al. | Aug. 28, 1945 |
| 2,412,575 | Frosch | Dec. 17, 1946 |
| 2,434,297 | Test et al. | Jan. 13, 1948 |
| 2,436,563 | Frosch | Feb. 24, 1948 |
| 2,580,544 | Herzog | Jan. 1, 1952 |

OTHER REFERENCES

Bulletin: RA-47-B, Lane Wells Co., 1948, Los Angeles, Calif, pp. 17 and 31.

Some Practical Aspects of Radioactivity Well Logging, Jackson et al., Amer. Inst. of Min. and Metallurgical Engineers, Technical Publication #1923, Feb. 1945, pp. 1–27.